Nov. 6, 1928.  
J. N. DAVIS  
1,690,887  
PROCESS AND MACHINE FOR THE MANUFACTURE OF STORAGE BATTERY PLATES  
Filed June 5, 1926    4 Sheets-Sheet 1
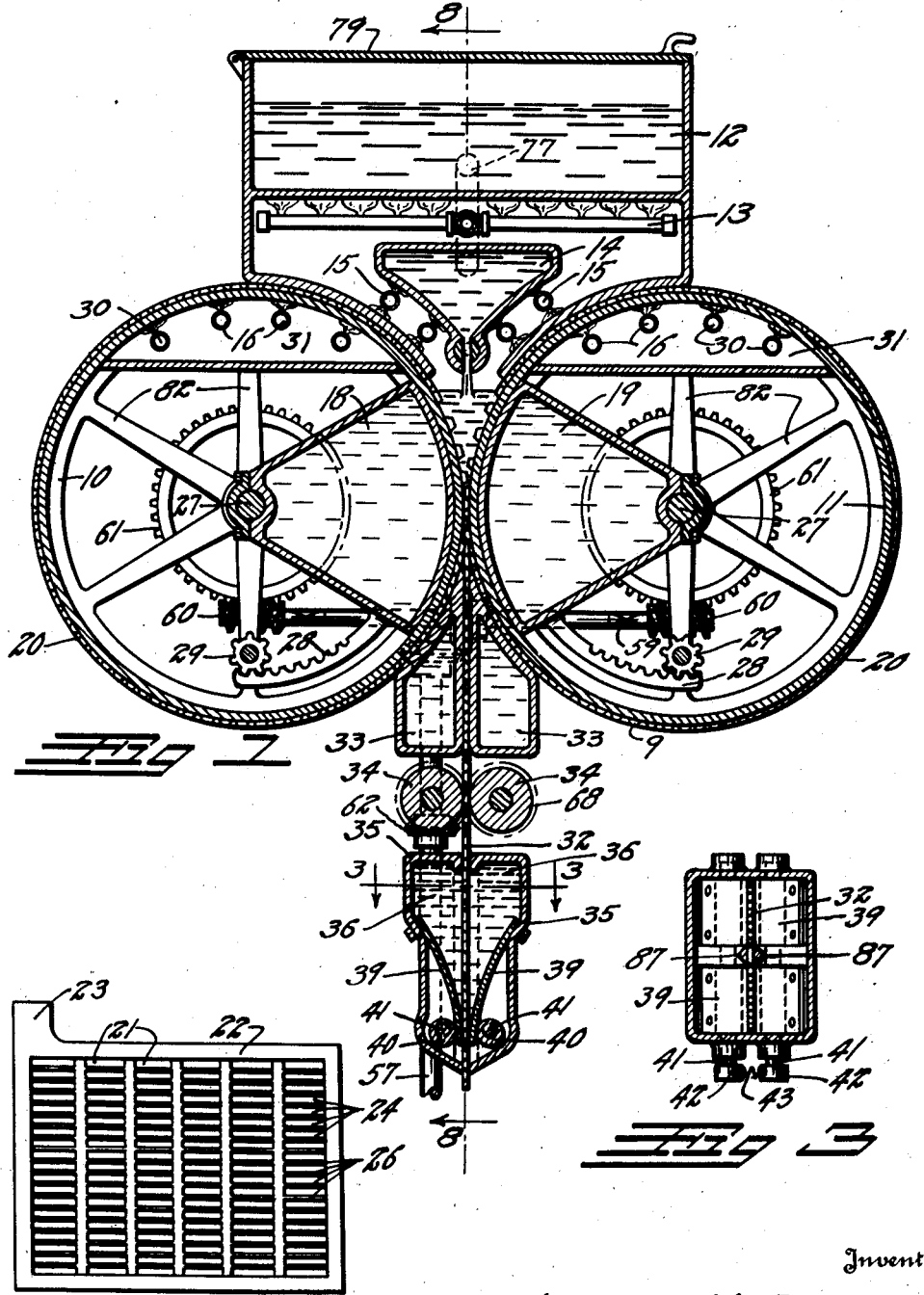
Inventor  
JASPER N. DAVIS  
By  
Attorney

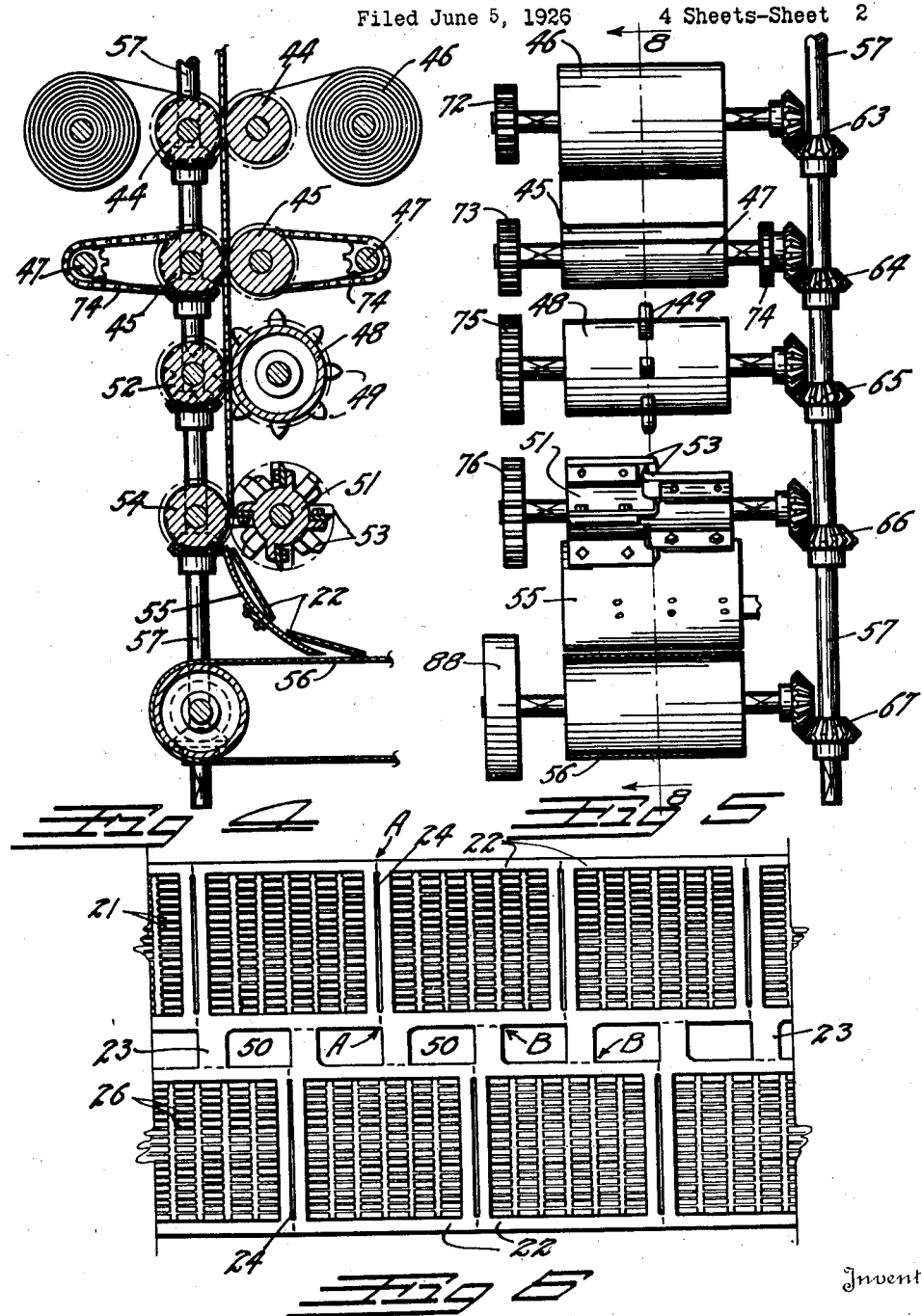

Nov. 6, 1928.  
J. N. DAVIS  
1,690,887  
PROCESS AND MACHINE FOR THE MANUFACTURE OF STORAGE BATTERY PLATES  
Filed June 5, 1926   4 Sheets-Sheet 3
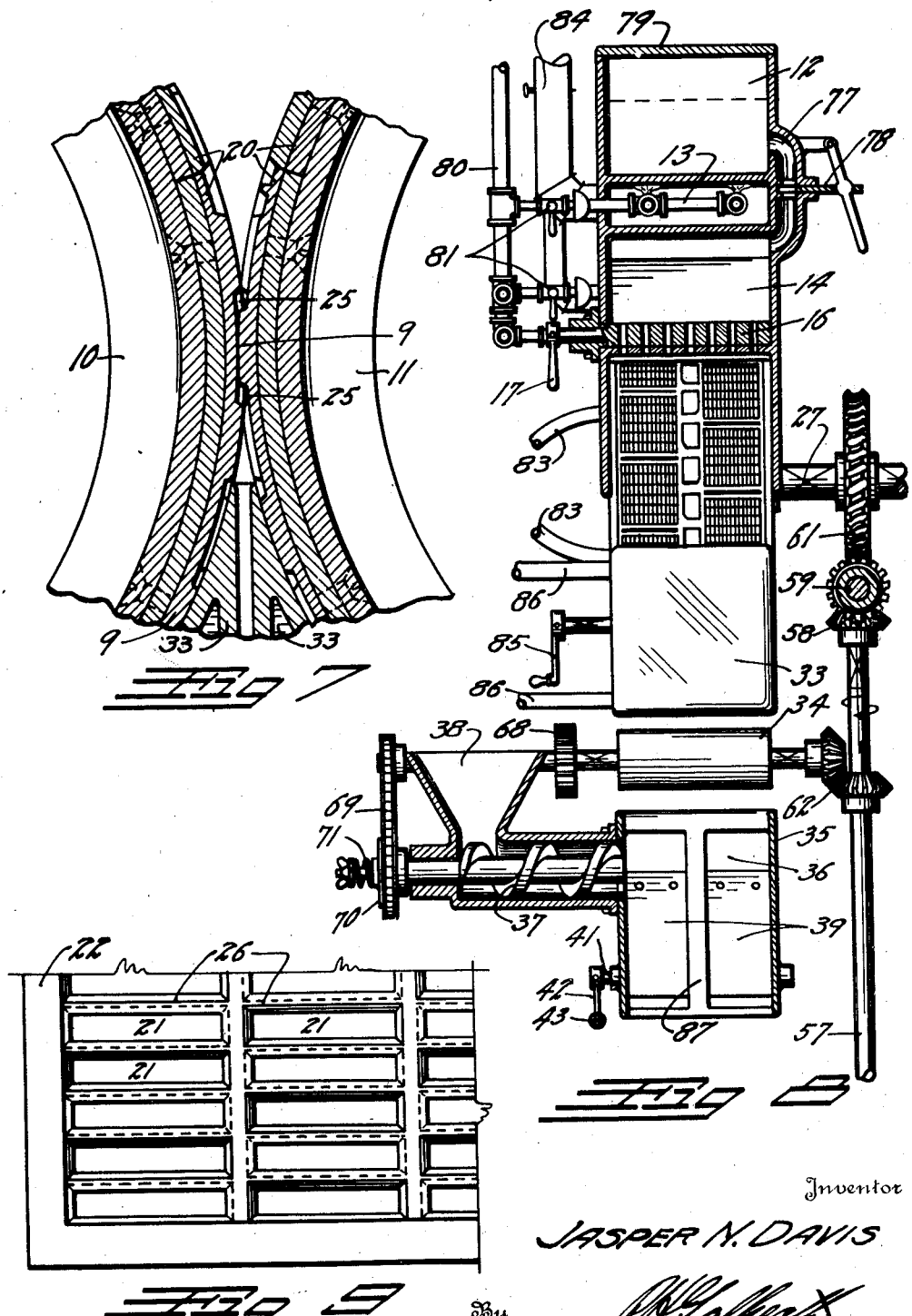
Inventor  
JASPER N. DAVIS

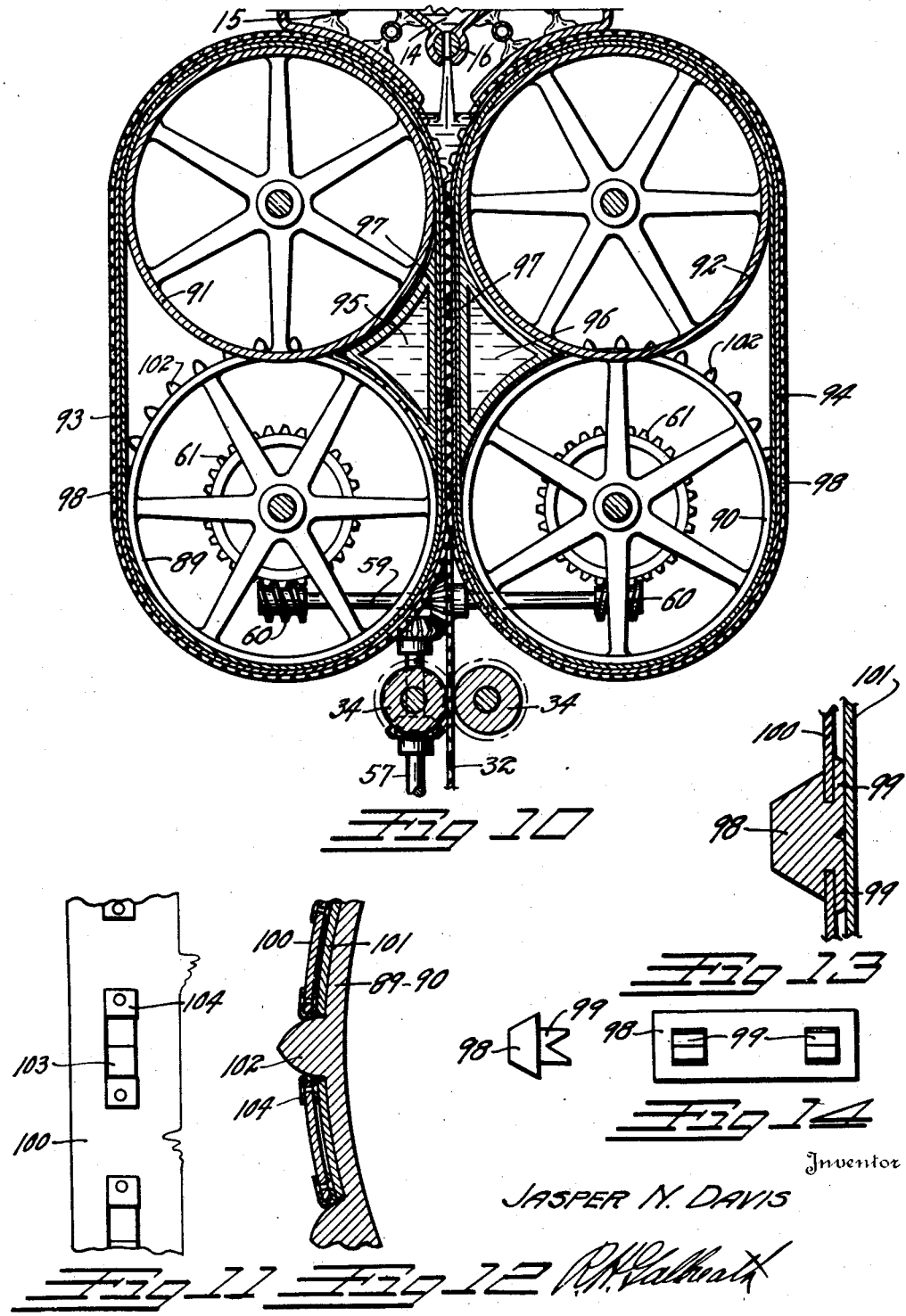

Patented Nov. 6, 1928.

1,690,887

UNITED STATES PATENT OFFICE.

JASPER N. DAVIS, OF DENVER, COLORADO.

PROCESS AND MACHINE FOR THE MANUFACTURE OF STORAGE-BATTERY PLATES.

Application filed June 5, 1926. Serial No. 113,879.

This invention relates to a machine for manufacturing storage battery plates, and has for its principal object, the provision of a machine which will carry through the complete process of forming a finished storage battery plate from the raw constituents.

Another object of the invention is to provide a casting machine which will form a continuous casting from molten metal.

Another object is to cast a continuous, connected series of storage battery grids and provide efficient means for separating the individual grids from the series.

Still another object is to provide means for pressing and rolling the active material into the grids in such a manner that it will not adhere to the pressing device.

A further object is to provide two co-acting molds for the molten metal which will automatically separate or draw away from each other leaving the casting free.

A still further object is to mold and carry the casting vertically so that gravity will assist in removing it from the molds and carrying it through the machine.

Other objects and advantages reside in the detail construction of the invention, which is designed for simplicity, economy and efficiency. These will become more apparent from the following description.

In the following detailed description of the invention, reference is had to the accompanying drawings, which form a part hereof. Like numerals refer to like parts in all views of the drawings and throughout the description.

In the drawings:

Fig. 1 is a vertical longitudinal section through the molding portion of the machine.

Fig. 2 is a detail view of a finished storage battery plate as manufactured by the machine.

Fig. 3 is a horizontal section through the pasting device, taken on the line 3—3, Fig. 1.

Fig. 4 is a vertical longitudinal section through the packing and cutting portion of the device.

Fig. 5 is a side elevation of that portion of the machine illustrated in Fig. 4.

Fig. 6 illustrates the continuous casting as molded by the machine.

Fig. 7 is an enlarged detail view illustrating the mold wheels at their point of contact.

Fig. 8 is a vertical lateral section through the complete machine, taken on the lines 8—8, Figs. 1 and 5.

Fig. 9 is a magnified view of a portion of a completed grid as cast by the machine.

Fig. 10 is a vertical section through an alternate form of the molding portion of the machine.

Fig. 11 is a detail view of a section of the molding band as employed in this alternate form.

Fig. 12 is an enlarged detail section through one of the band wheels of Fig. 10.

Fig. 13 is a detail view illustrating the method of attaching the mold projections to the band.

Fig. 14 illustrates an end and bottom view of one of the mold lugs carried by the molding band.

The preferred form of my invention is illustrated on sheets 1 to 3, inclusive, and comprises a pair of co-acting mold wheels 10 and 11 which rotate about axles 27 below a lead reservoir 12, heated by a gas jet 13 and closed by a hinged lid 79. The mold wheels 10 and 11 are supported on spokes 82 at one edge of their rim, the other edge being open. Immediately below the reservoir 12, is an entirely closed, secondary reservoir 14 heated by gas jets 15. The secondary reservoir receives its supply of lead from the primary reservoir 12, through a riser 77 controlled by a gate valve 78. By this arrangement, the secondary reservoir may be kept filled and a constant pressure supplied to the valve 16. The pressure in the secondary reservoir will not depend upon the level of the lead in the main reservoir which will naturally vary as new lead is supplied.

The secondary reservoir 14 extends across the width of the machine, its bottom being V-shaped in cross section and terminating in a cylindrical valve 16, operated by a handle 17. The valve 16 contains a series of diametrically-placed openings through which the melted lead flows between the mold wheels 10 and 11. The mold wheels 10 and 11 rotate in opposite directions and downwardly at their contact point. The lead flows between the contacting mold wheels and is cooled in this position by means of water jackets 18 and 19 which contact with the interior of the mold wheel rims and are supplied with cooling water through flexible conductors 83. The mold wheels carry mold plates 20 which are provided with a series of projections 9 in the form of truncated pyramids which form cells 21 in the casting.

The complete casting, as produced by the lead flowing between the contacting molds 20 and solidifying therein, is illustrated in Fig. 6 and comprises two series of storage battery grids 22 joined at their terminal lugs 23. The grids in each series are separated by narrow slots 24, which are formed by narrow projections in the mold plates 20. The projections 9 on the mold plates are in staggered relation, that is a projection 9 on the mold wheel 10 passes between the projections 9 on the mold wheel 11, so that each of the cells 21 in the grids 22 will have a larger cross sectional area at one face of the grid than its adjacent cells. The spaces separating the projections 9 on the mold plates are greater than the size of the projections, so that spaces 25 are left when the mold plates contact. The spaces 25 fill with lead to form the skeleton bars 26 surrounding the cells 21. Owing to the pyramidal form of the projections on the mold plates, these skeleton bars will be rhomboidal in cross section.

The area cooled by the water jackets 18 and 19 may be adjusted so that the melted lead will fill the molds and solidify at the proper time. This is accomplished by journaling the water jackets upon the axles 27 of the mold wheels, and rotating them thereabout by means of racks 28 and pinions 29, operated from adjusting handles 85, until the cooled area has been placed in the desired position. Should is be desired to heat the mold wheels and their mold plates, gas jets 30 are provided in a heating chamber 31 on the interior of each mold wheel. The gas jets 13, 15, and 30 are supplied from a gas line 80 and controlled by suitable gas valves 81, the burned gases being carried off through a stack 84.

The sides of the reservoir 12 extend downwardly and partially surround the periphery of each mold wheel and serve to additionally heat the wheel. The gas jets 15 may be constructed as shown in Fig. 1 to heat these projecting sides of the reservoir 12, if desired.

Upon leaving the mold wheels, the casting 32 immediately passes between two secondary water jackets 33 which are supplied with water from suitable pipes 86, and which complete the cooling thereof. From the water jackets 33, the casting passes between pressing rolls 34 which smooth and iron out any irregularities in the casting before it enters a pasting device 35.

The pasting device 35 comprises two chambers 36, placed on opposite sides of the casting and arranged to contain active material for the storage battery plates in the form of paste under pressure. The paste is supplied to the chambers 36 and maintained under pressure by means of a screw conveyor 37, which receives the paste from a feed hopper 38. The screw conveyor 37 is placed opposite one edge of the casting 32 and opens to both the chambers 36. Within the chambers 36 are spring trowels 39 which constantly press against the faces of the casting and force the paste into the cells 21. The trowels are maintained in engagement with the casting by their inherent elasticity assisted by cams 40 carried by cam shafts 41, which constantly contact with the lower portions of the trowels. The cam shafts 41 extend beyond the pasting device 35, terminating in levers 42 which are drawn together by a spring 43, the tension of which forces the cams 40 against the trowels 39. A partition 87 is provided in the pasting device 35 at each side of the casting and over that portion of the casting containing the terminal lugs 23 to prevent paste from entering the spaces between the lugs.

The casting leaves the pasting device 35, through a narrow orifice in its bottom, which removes any surplus paste from its faces and enters between two pairs of paste pressing rolls 44 and 45. Strips of paper are fed from paper rolls 46 between the pasting rolls 44 and 45 and the casting to prevent the paste from adhering to the rolls. This paper is wound from the rolls 46 onto receiving rolls 47.

A synchronizing roll 48 is placed below the pasting rolls and is provided with teeth 49 which engage in the spaces 50 between the terminal lugs 23, to properly time the travel of the casting with a rotary cutter 51. On the opposite side of the casting from the synchronizing roll 48, is a female roller 52, provided with indentations for the reception of the teeth 49, which maintains the casting in engagement with the synchronizing roll 48.

The cutter 51 carries blades 53 which contact with a bottoming roll 54 and cut or punch through the casting, at the points indicated in broken line in Fig. 6, to separate it into individual storage battery plates such as indicated in Fig. 2. The blades separate the casting at the extremities of the slots 24 at the points indicated at "A," Fig. 6, and separate the terminal lugs from the adjacent castings at the point indicated at "B," in that figure. The separated plates fall from the cutter on a chute 55 which directs them onto a belt conveyor 56 arranged to carry them to the pickling or any desired subsequent operation.

The entire mechanism of the machine is driven from a common vertical shaft 57, which communicates, through bevel gears 58, with a cross shaft 59 carrying at its extremities worms 60 which drive the mold wheels 10 and 11 through worm wheels 61. The pressing rolls 34, pasting rolls 44 and 45, the female roll 52, the bottoming roll 54 and the belt conveyor 56 are driven from the vertical shaft 57 through pairs of miter gears 62, 63, 64, 65, 66 and 67 respectively. The pressing rolls 34 are caused to travel in unison by contacting spur gears 68 on their shafts. The screw conveyor 37 is driven from the shafts of the pressing rolls by a chain 69, a suitable clutch 70 being provided to allow the screw to slow down or stop, should the pressure in the chambers 36 reach a predetermined point, according to the adjustment of a clutch spring 71. The pasting rolls 44 and 45 are caused to rotate in unison by pairs of spur gears 72 and 73, respectively. The receiving rolls 47 are driven from the pasting rolls 45 through chains 74, there being suitable slip clutches provided as is usual in the rolling arts to accommodate the increasing diameter of the paper rolls thereon. The synchronizing roll 48 and the female roll 52 are caused to operate in unison by a pair of spur gears 75 as are the cutting roll and the bottoming roll 54 by a similar pair of spur gears 76.

In Fig. 10, I have illustrated an alternate method of carrying the traveling molds of the device. In this form, two series of driving band wheels 89 and 90 are placed opposite each face of the casting 32, the outermost one of each series being provided with teeth 102. Above the band wheels 89 and 90, are two series of idler band wheels 91 and 92. Each series of band wheels comprises separate, spaced-apart, similar wheels carried on a common shaft. The wheels in the drive band series overlap and pass between the wheels in the idler band series.

An endless, flexible, metal band, designated in its entirety by the numeral 93, passes around the band wheels 89 and 91 and a similar band passes around the band wheels 90 and 92. These bands carry projections similar to the projections 9 on the mold wheels of the previously described form. The projections and belts contact throughout a vertical distance between the band wheels to form molds for the casting 32.

At the molding portion, the bands and projections are maintained in contact by means of oppositely placed water jackets 95 and 96 which are placed between the band wheels and the band and have flat surfaces 97 over which the backs of the bands 93 and 94 travel.

The drive wheels 89 and 90 are driven from the cross shaft 59 by means of worms 60 and worm wheels 61, as are the mold wheels of the previous form. The melted lead is introduced from the secondary reservoir 14 through the valve 16 between the approaching bands on the idler band wheels 91 and 92. From the bands the casting travels through the machine similarly to the previously described form. The alternate form has an advantage, however, in that the co-acting molds are maintained together for a longer distance of travel to allow more effective cooling of the casting.

The bands 93 and 94 are laminated, that is, each comprise a molding band 100 and a backing band 101. The projections on the bands which form the cells 21 in the casting are illustrated in detail in Figs. 13 and 14 and each comprise a lug 98 in the form for a truncated pyramid which is provided with split rivets 99 arranged to be passed through openings in the molding band 100 and clinched against the rear surface thereof, as illustrated in Fig. 13. If desired, these lugs may be brazed to the band after they are in position.

The molding bands 100 form the sides of the mold. The backing band 101 covers the projecting rivets 99 and forms a smooth surface for contact with the band wheels and the water jackets.

In Fig. 11, a section of one edge of the bands 93 and 94 is illustrated. In this edge, openings 103 are formed for the reception of the teeth 103 which serve to positively control the position of the bands and cause them to synchronize with each other. To prevent wear on the band at the openings 103, U-shaped clips 104 are riveted to the molding band at each extremity of the opening.

While a specific form of the improvement has been described and illustrated herein, it is desired to be understood that the same may be varied, within the scope of the appended claims, without departing from the spirit of the invention.

Having thus described the invention, what I claim and desired secured by Letters Patent is:—

1. A machine for forming a continuous casting from molten metal comprising two co-acting series of traveling molds arranged to receive said metal between them and form sides for a traveling mold; tapered projections on the molds of one series adapted to alternatedy project between similar projections on the molds of the other series to form a perforated casting having alternately tapering perforations.

2. A machine for forming a continuous casting comprising two adjacent wheels, co-acting molds on the surface of said wheels, which, when said wheels are in contact, form a completed mold; a water jacket arranged on the interior of said wheels adjacent their point of contact; metans for supplying molten metal to said point of contact; and other water jackets arranged to contact with said metal after it has left said wheels, said latter jackets being arranged so that said metal must pass between them after leaving said wheels.

3. A machine for forming a continuous casting comprising two adjacent wheels, co-acting molds on the surface of said wheels, which, when said wheels are in contact, form a completed mold; a water jacket arranged on the interior of said wheels adjacent their point of contact; and means for supplying molten metal to said point of contact, said water jackets being adjustable so that their positions on the wheels may be varied to control the cooling of said molds as desired.

4. A continuous casting machine comprising two coacting mold wheels arranged to form a continuous casting between them; a main metal reservoir above said mold wheels; a heating chamber between said reservoir and said wheels so as to simultaneously heat said reservoir and both said mold wheels; and an auxiliary reservoir within and surrounded by said heating chamber and adapted to receive metal from said main reservoir and deposit same between said mold wheels.

5. In a drum carrying a continuous casting mold, means for controlling the cooling of said drum comprising a water jacket concentrically pivoted within said drum, so that a cooled surface of said jacket would slidably contact with the inner face of said casting mold; and means for swinging said jacket on its pivot so as to change its relative circumferential position with reference to said casting mold.

In testimony whereof, I affix my signature.

JASPER N. DAVIS.